(12) United States Patent
Loffink

(10) Patent No.: US 10,112,477 B2
(45) Date of Patent: Oct. 30, 2018

(54) TUBE SUPPORT ASSEMBLY

(71) Applicant: John Loffink, Damascus, OR (US)

(72) Inventor: John Loffink, Damascus, OR (US)

( * ) Notice: Subject to any disclaimer, the term of this patent is extended or adjusted under 35 U.S.C. 154(b) by 133 days.

(21) Appl. No.: 15/018,495

(22) Filed: Feb. 8, 2016

(65) Prior Publication Data
US 2016/0236565 A1 Aug. 18, 2016

Related U.S. Application Data

(60) Provisional application No. 62/115,811, filed on Feb. 13, 2015.

(51) Int. Cl.
*B60P 3/00* (2006.01)
*B60K 15/03* (2006.01)
*B60K 15/01* (2006.01)

(52) U.S. Cl.
CPC .............. *B60K 15/03* (2013.01); *B60K 15/01* (2013.01); *B60K 2015/03032* (2013.01); *B60K 2015/03453* (2013.01)

(58) Field of Classification Search
CPC ... B60K 15/03–15/03006; B60K 15/01; B60K 15/013; B60K 2015/016; B65D 2015/03335; B65D 2015/03381; B65D 2015/03421; B65D 2015/03447; B65D 2015/03453
USPC ... 220/562–564, 565–567.3, 560.04–560.15, 220/581–592
See application file for complete search history.

(56) References Cited

U.S. PATENT DOCUMENTS

| | | | | |
|---|---|---|---|---|
| 6,273,123 B1 * | 8/2001 | Keefer | ............... | F02M 37/0017 123/469 |
| 2007/0157454 A1 * | 7/2007 | Keefer | ............... | F16L 13/0209 29/525.13 |
| 2009/0301590 A1 * | 12/2009 | Waymire | ........... | F02M 37/0023 137/627.5 |
| 2014/0110416 A1 * | 4/2014 | Watson | ................. | B60K 15/01 220/601 |
| 2015/0007899 A1 * | 1/2015 | Ekstam | ............. | F02M 37/0076 137/590 |

* cited by examiner

*Primary Examiner* — Kareen Thomas
(74) *Attorney, Agent, or Firm* — Ingrid McTaggart

(57) ABSTRACT

A fuel tank assembly includes a securement structure that may be secured to a fuel tank. The securement structure may stabilize the lower regions of a draw tube and a return tube positioned within the fuel tank such that movement and vibration of the draw and return tubes is reduced during motion of the vehicle to which the fuel tank is secured.

15 Claims, 5 Drawing Sheets

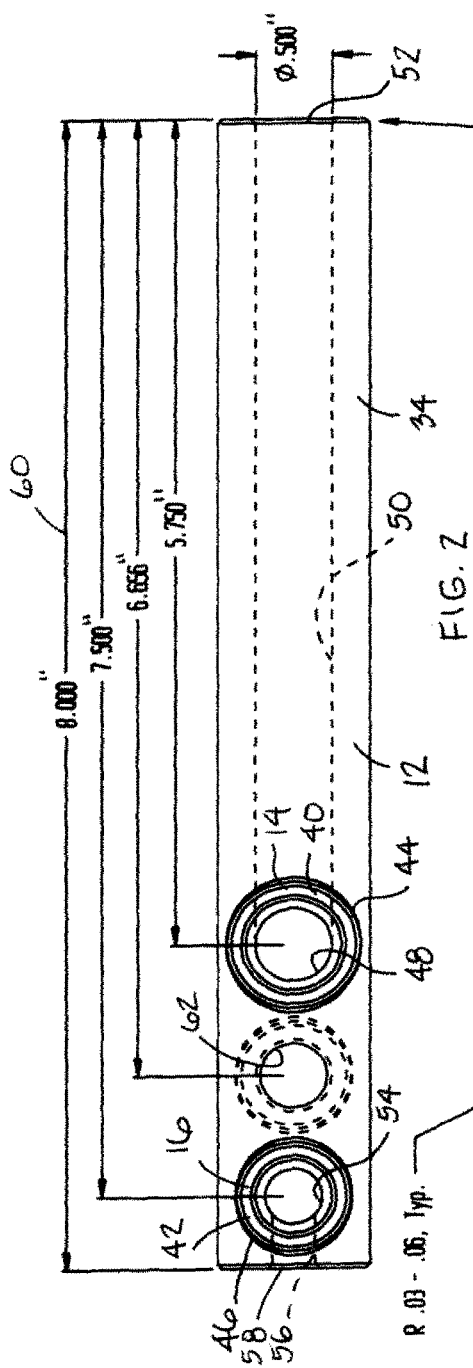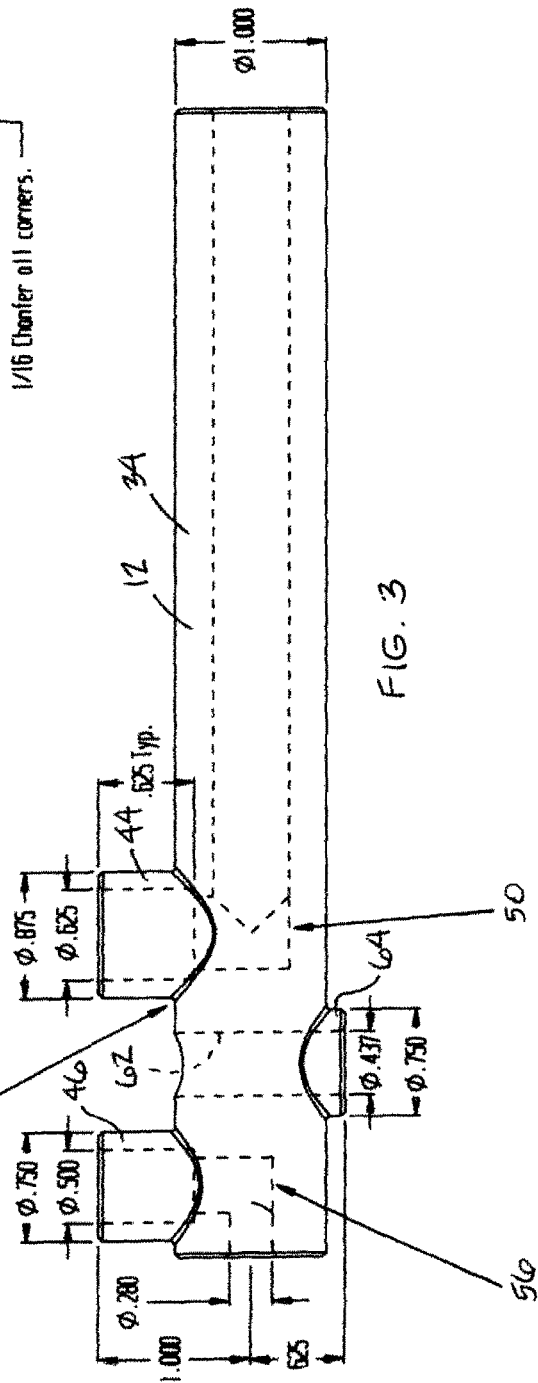

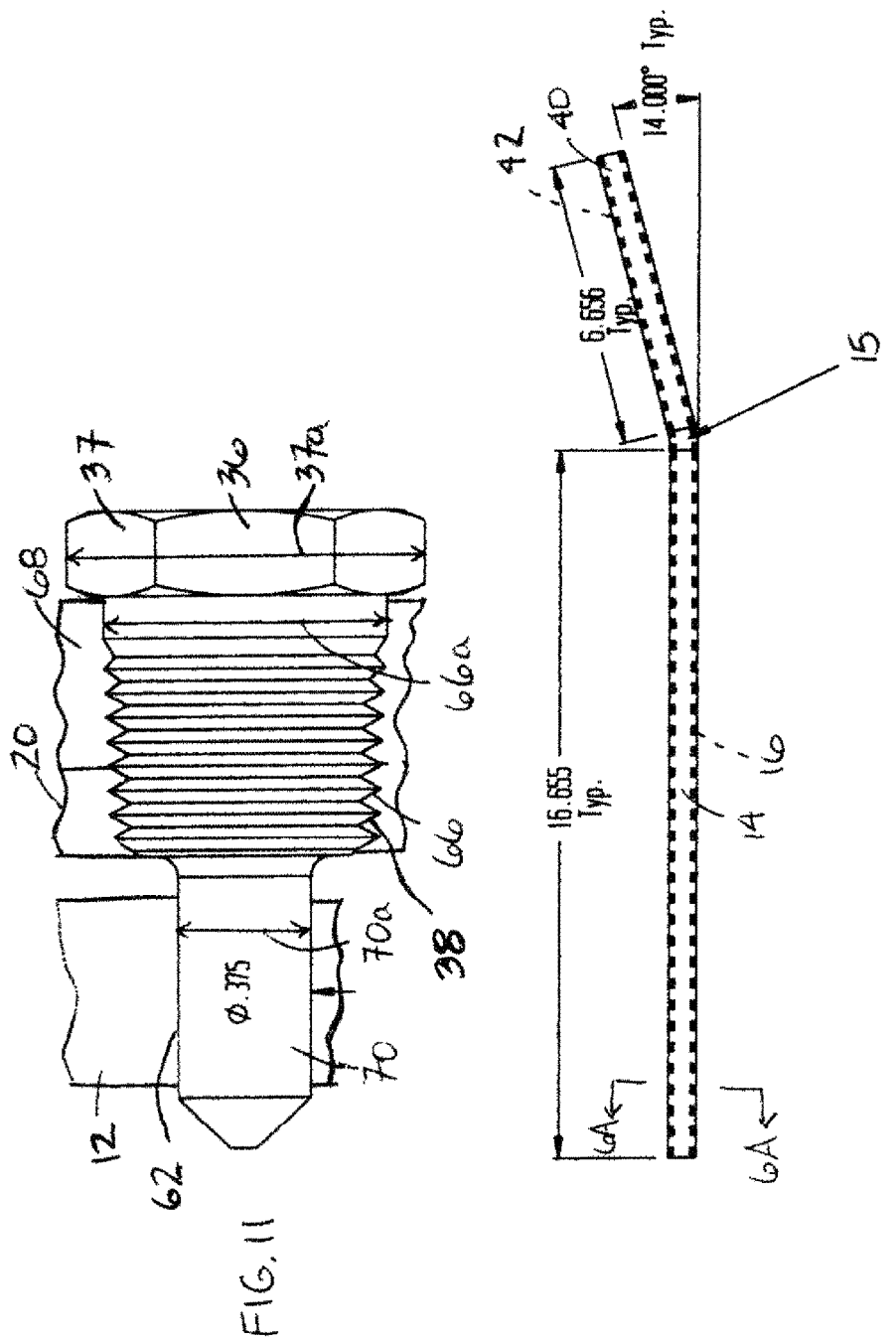
FIG. 11
FIG. 7
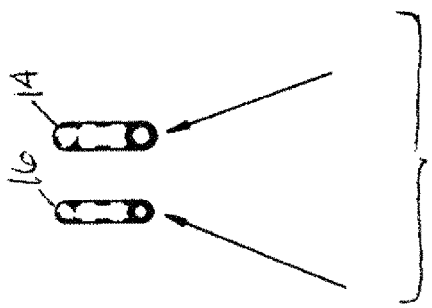
FIG. 6

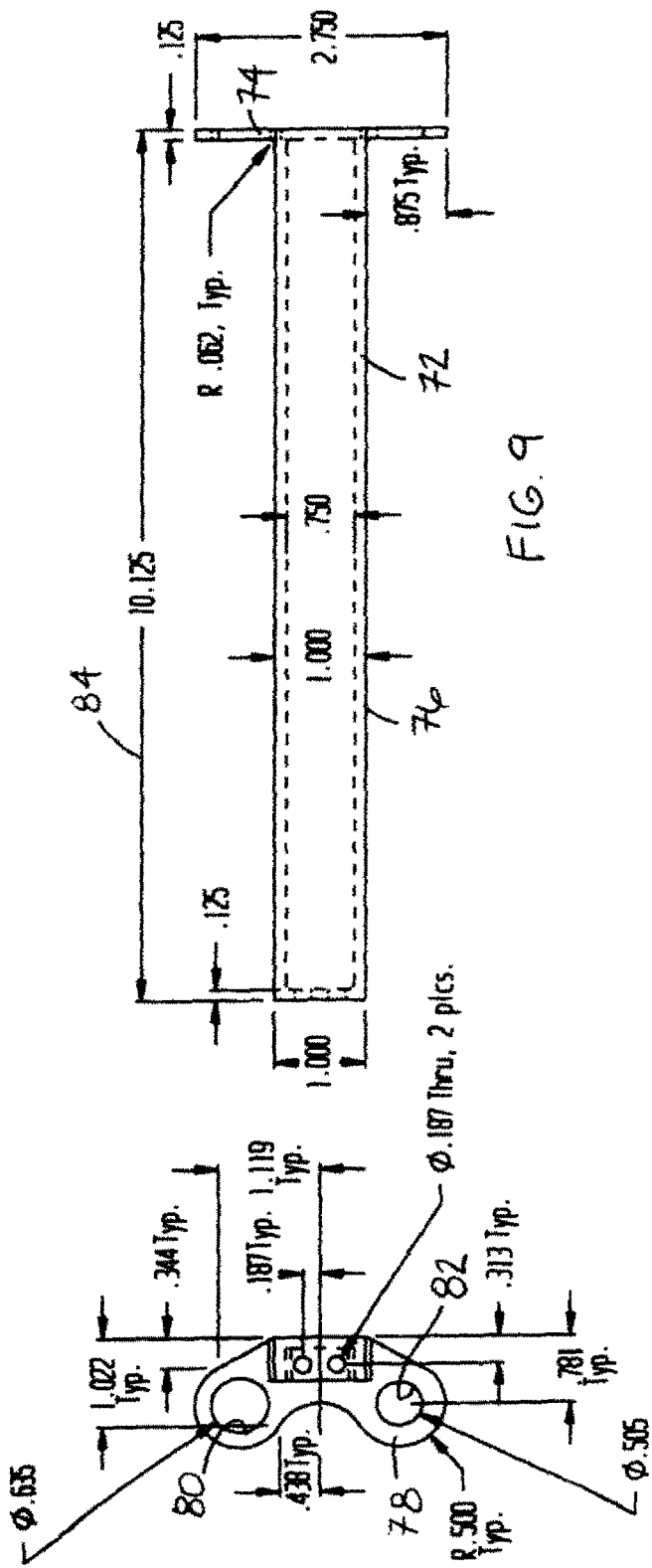

TUBE SUPPORT ASSEMBLY

This application claims the benefit of U.S. provisional patent application filed on Feb. 13, 2015, having patent application No. 62/115,811, in the name of inventor John Loffink, and entitled TUBE SUPPORT ASSEMBLY.

TECHNICAL FIELD

The present invention relates to a fuel tank assembly, and a process of manufacturing the same, for use in commercial vehicles, and more particularly, to a fuel tank assembly that provides securement of a lower end of a draw tube and a return tube to a lower interior surface of a fuel tank such that during use of the vehicle draw and return tube movement and vibration is reduced.

BACKGROUND OF THE INVENTION

Prior art fuel tanks typically include draw and return tubes secured at their upper end to the upper surface of a fuel tank. During motion of the vehicle the lower end of the draw and return tubes may be subject to movement and/or vibration which may damage the fuel tank or the tubes themselves, and which may damage or loosen securement of the top end of the draw and return tubes at the upper surface of the fuel tank.

SUMMARY OF THE INVENTION

The present invention provides a fuel tank assembly, and a process of manufacturing the same, that overcomes the disadvantages of the prior art. One aspect of the present invention provides a fuel tank securement structure that secures a lower end of a fuel draw tube and fuel return tube to a lower interior surface of a fuel tank by utilizing a drain aperture of the fuel tank.

BRIEF DESCRIPTION OF THE DRAWINGS

FIG. 2 is a plan view of the securement structure of FIG. 1.

FIG. 3 is a side view of the securement structure of FIG. 1.

FIG. 6 is a cross sectional plan view of the draw and return tubes unsecured to a securement structure or to a flange.

FIG. 7 is a side view of a draw tube of FIG. 1 unsecured to a securerment structure or to a flange.

FIG. 8 is an end view of one example embodiment of a tube support.

FIG. 9 is a bottom view of the tube support of FIG. 8.

FIG. 10 is a side view of the tube support of FIG. 8.

FIG. 11 is a detailed cross sectional view of the fastener of FIG. 1 positioned in the fuel tank drain aperture.

DETAILED DESCRIPTION OF THE PREFERRED EMBODIMENTS

The invention discloses a fuel tank assembly that allows a draw and a return tube to be secured at their lower end within a fuel tank, thereby reducing movement and vibration of the fuel tubes during use of a vehicle on which the tubes are mounted. The assembly may be secured within a drain aperture of a fuel tank which may allow the assembly to be secured within fuel tank that is already installed on a commercial vehicle.

Figure 1:
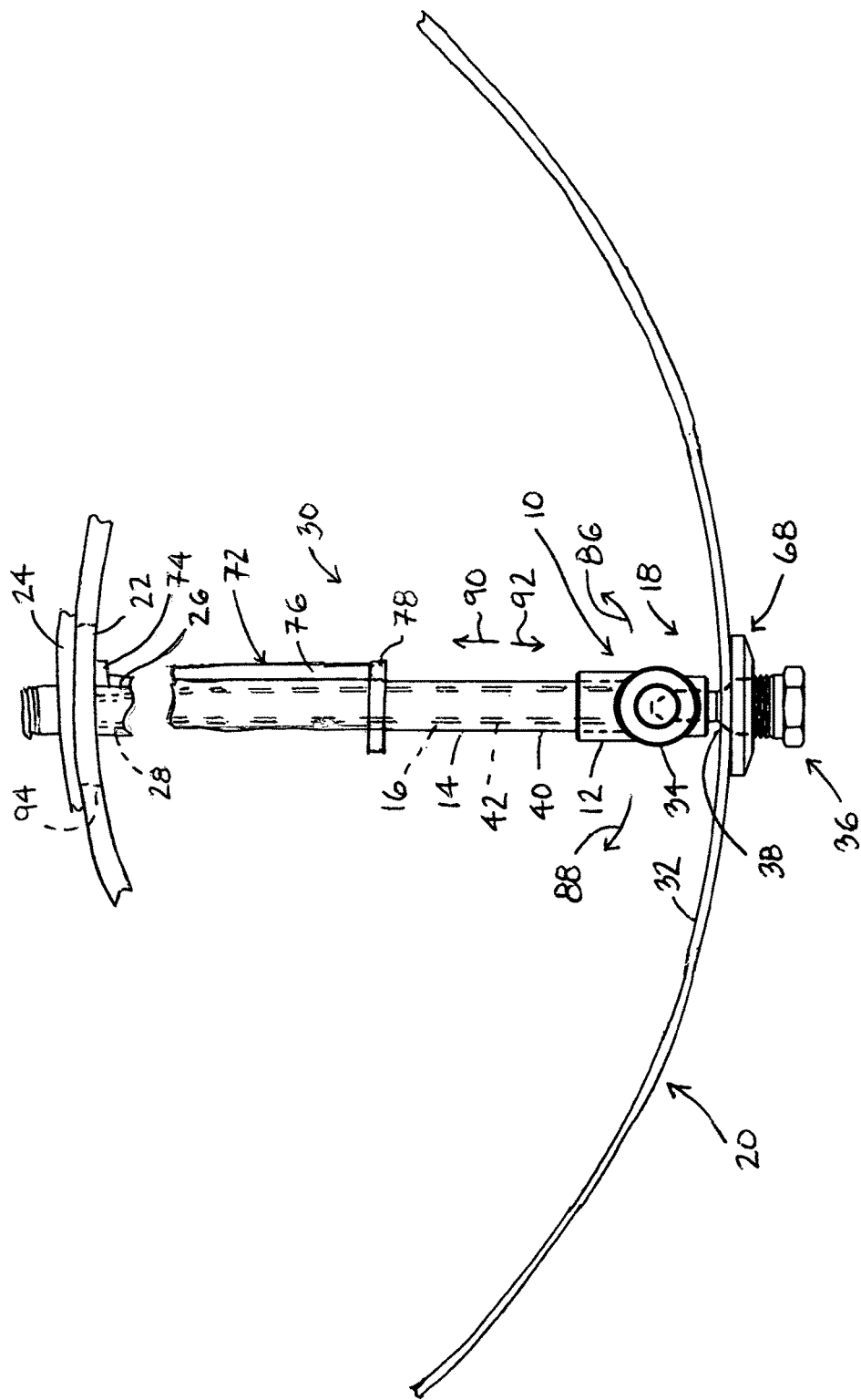
FIG. 1 is a side cross sectional view of one example embodiment of the assembly of the present invention including a securement structure securing a draw tube and a fuel tube to a lower region of a fuel tank.

FIG. 1 is a side cross sectional view of one example embodiment of the assembly 10 of the present invention including a securement structure 12 securing a draw fuel tube 14 and a return fuel tube 16 to a lower region 18 of a fuel tank 20.

Fuel tank 20 includes an upper surface 22 that may include a flange 24 secured thereto, wherein upper regions 26 and 28 of the draw and return tubes 14 and 16 may be secured to the flange or to the upper surface of the fuel tank. An interior 30 of the fuel tank 20 may be defined by upper surface 22 and a lower surface 32 of the fuel tank. Fuel tank 30 may have a generally round cross sectional shape as shown, but may also be formed in any shape or size as desired.

Securement structure 12 may include an elongate member 34 such as a tube and a fastener 36 positioned through an aperture 38 in fuel tank 20. Aperture 38 may be a drain aperture used to drain the fuel tank 20 when desired. Fastener 36 may be positioned through drain aperture 38 and then secured within elongate member 34 to secure the elongate member to fuel tank 20 and thereby secure lower regions 40 and 42 of corresponding fuel tubes 14 and 16 to lower surface 32 of the fuel tank 20.

FIGS. 2 and 3 are a plan view and a side view, respectively, of the securement structure 12 of FIG. 1. Structure 12 includes elongate member, or a tube, 34 having a first projection 44 for receiving lower region 40 of draw tube 14 and a second projection 46 for receiving lower region 42 of return tube 16. First projection 44 may include a fluid flow path 48 that communicates with a first fluid flow path 50 through tube 34, and which terminates in a fluid exit and/or entrance aperture 52. Second projection 46 may include a fluid flow path 54 that communicates with a second fluid flow path 56 through tube 34, and which terminates in a fluid exit and/or entrance aperture 58. Fluid apertures 52 and 58 may be positioned on opposite ends of tube 34 and spaced apart by a length 60 of tube 34, such as eight inches in the embodiment shown, such that warm fuel returned to fuel tank 20 through aperture 58 is not returned to fuel tank 20 adjacent to fuel drawn from tank 20 through aperture 52. In this manner, the entrance and/or exit of flow paths 50 and 56 are spaced a distance 60 from one another, without requiring bending of the ends of draw and return tubes and to space the ends from one another, as in prior art draw and return tube assemblies. Accordingly, securement structure 12 of the present invention allows for more time efficient and less costly manufacturing and installation of a fuel draw and return tube assembly.

Tube 34 further includes a fastener aperture 62 for receiving and securing fastener 36 therein so as to secure tube 34 to fuel tank 20. In particular, fastener 36, in one example embodiment, may comprise a bolt shape having a head region 37 (FIG. 5) having a diameter 37a that is larger than aperture 38 of fuel tank 20, and larger than a diameter 66a of threaded region 66 of the fastener, such that threaded region 66 of fastener 36 may pass through and be secured within mating threads of aperture 38 of fuel tank 20 or within mating threads of a flange 68 secured to fuel tank 20 (FIG. 1). Fastener 36 may further comprise an end region 70 that has a smaller diameter 70a than diameter 66a of threaded region 66, and is secured within aperture 62 of tube 34. Aperture 62 may be positioned between projections 44 and 46 so as to provide stability to tubes 14 and 16 (FIGS. 1) when the tubes 14 and 16 are secured to tube 34. Tube 34 may further include a third projection 64, on an underside of tube 34 and opposite from projections 44 and 46, at fastener aperture 62 which may reduce movement of tube 34 with respect to fastener 36 when the tube 34 is secured to fuel tank 20.

In one example embodiment aperture 62 may include threads to secure a threaded region 70 of fastener 36 therein. In the embodiment shown, aperture 62 may have smooth internal sides and may receive the smooth sides of end region 70 of fastener 36 therein, wherein the length of tubes 14 and 16 extending from under surface 22 of fuel tank 20 to first and second projections 44 and 46 of tube 34, will function to retain tube 34 in place on fastener 36 at aperture 38 of lower surface 32 of fuel tank 20. Use of a fastener 36 have a smooth sided end region 70 that is received within a smooth sided aperture 62 of tube 34 may allow tube 34 to move slightly upwardly or downwardly along end region 70 during slight contraction or expansion of the size of fuel tank 20 due to a change in temperature or other operating conditions or during slight vibrations of the vehicle during use. Accordingly, the assembly 10 of the present invention may hinder tubes 14 and 16 from vibrating from side to side in directions 86 and 88 (FIG. 1) during use which may cause damage to the tubes, the flange or the fuel tank, yet assembly 10 may still allowing for slight movement of tube 34 upwardly or downwardly in directions 90 and 92 on end region 70 (FIG. 1) of fastener 36 during contraction or expansion of the fuel tank due to temperature variations. Moreover, the assembly 10 of the present invention may allow for retrofit securement of the lower regions 40 and 42 of tubes 14 and 16 inside the fuel tank by placement of fastener 36 through a drain aperture 38 of a fuel tank, without requiring additional apertures to be cut into the fuel tank 20.

Figure 4:
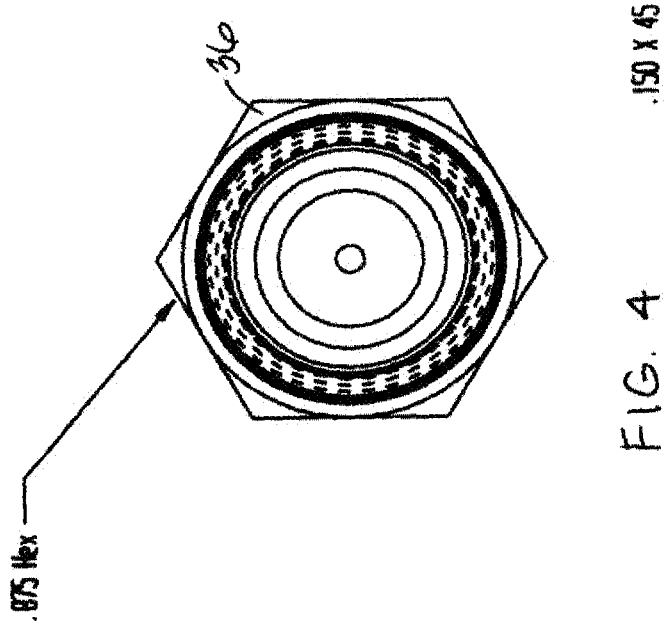
FIG. 4 is a plan view of a fastener for securing the securement structure of FIG. 2 to a fuel tank.

FIG. 4 is a plan view of a fastener 36 for securing the securement structure 12 of FIG. 2 to a fuel tank 20. Fastener 36 may include threads 66 which may be threadably received within flange 68 (FIG. 1) secured to fuel tank 20 around drain aperture 38. Fastener 36 may further include an end region 70 that is received within third projection 64 and fastener aperture 62 of securement structure 12. By utilizing drain aperture 38 to secure securement structure 12 within tank 20, the previously manufactured drain aperture may be used, rather than creating a new hole within fuel tank 20, which may help to ensure the integrity of the fuel tank 20 against further leaks. Additionally, use of drain aperture 38 to secure securement structure 12 may allow the assembly 10 of the present invention to be easily secured within a fuel tank 20 as a retrofit or after market accessory without alternation to the fuel tank 20 itself.

Figure 5:
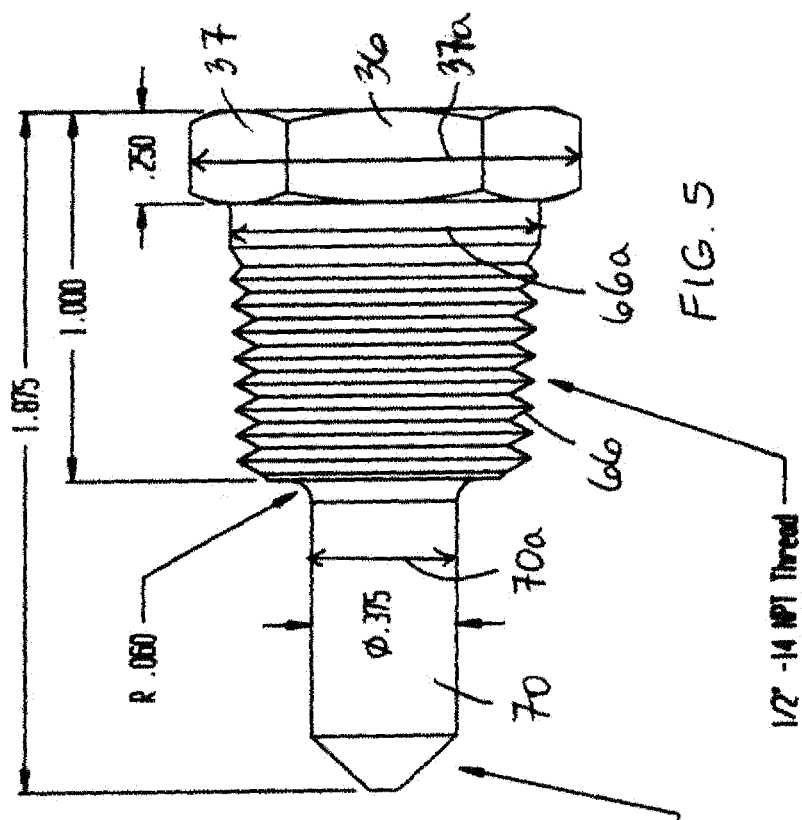
FIG. 5 is a side view of the fastener of FIG. 4.

FIG. 5 is a side view of the fastener 36 of FIG. 4.

FIG. 6 is a plan view of the draw and return tubes 14 and 16 of FIG. 1 taken along line 6A-6A of FIG. 7, the tubes unsecured to a securement structure or to a flange.

FIG. 7 is a side view of the draw and return tubes 14 and 16 of FIG. 1 with the tubes disconnected from flange 24 and from securement structure 12. As shown in this figure, tubes 14 and 16 each include a slight bend in the tubes at a region 15 which allows the tubes to be placed in a cylindrical fuel tank 20 without end regions 40 and 42 contacting the inner surface 32 of the fuel tank. Additionally, tubes 14 and 16 are shown without a second bend in their end regions 40 and 42 because spacing of the fuel tube draw aperture and the fuel tube return aperture is accomplished by use of tube 34 and not by bending of the end of tubes 14 and 16 themselves, as in the prior art. Accordingly, the manufacturing process of tubes 14 and 16 is less time consuming and less labor intensive than the process of manufacturing draw and return tubes of the prior art.

FIGS. 8, 9 and 10 are an end view, a bottom view, and a side view, respectively, of one example embodiment of a tube support 72. (FIGS. 9 and 10 show the tube support 72 with a stabilization 78 disconnected from an elongate member 76, whereas FIG. 1 shows the tube support 72 connected to the stabilization plate 78.) Tube support 72 may include a base 74 that is secured to upper surface 22 of fuel tank 20 (FIG. 1). Support 72 may further include an elongate member 76 that extends from base 74 to a stabilization plate 78. Plate 78 may include a first aperture 80 sized to receive draw tube 14 (FIG. 1) there through, and a second aperture 82 sized to receive return tube 16 (FIG. 1) there through. A length 84 of elongate member 76 is sized such that when base 72 is secured to upper surface 22 of fuel tank 20, stabilization plate 78 is positioned at approximately the mid point of tubes 14 and 16 between the upper and lower surfaces 22 and 32 of fuel tank 20 (FIG. 1), and extends downwardly from flange 24 (FIG. 1) at least one third a length of fuel tubes 14 and 16. In this manner, tube support 72, together with securement structure 12, both provide stability and reduce movement and vibration of tubes 14 and 16 within tank 20 during motion of a vehicle on which fuel tank 20 is mounted.

Tube support 72, draw and return tubes 14 and 16, and securement structure 12, may be placed within fuel tank 20 through an aperture 94 (FIG. 1) within upper surface 22 of fuel tank 20 such that additional apertures need not be formed in fuel tank 20. In one embodiment, tube support 72 and draw and return tubes 14 and 16 may be secured to flange 22, and securement structure 12 may be secured to the lower region 40 and 42 of tubes 14 and 16. The flange may then be secured to fuel tank 20 such that tube support 72, tubes 14 and 16, and securement structure 12, are all positioned within the interior 30 of fuel tank 20. Fastener 36 may then be placed through drain aperture 38 of the fuel tank to secure securement structure 12 in place. In this manner the assembly 10 may be secured within fuel tank 20 as an after market device, without requiring forming additional apertures within the fuel tank.

FIG. 11 is a detailed cross sectional view of the fastener 36 of FIG. 1 positioned in the fuel tank drain aperture 38 of the fuel tank.

As may be understood from the above description and drawings, the present invention has many advantages over prior art fuel tank assemblies.

In the above description numerous details have been set forth in order to provide a more through understanding of the present invention. It will be obvious, however, to one skilled in the art that the present invention may be practiced using other equivalent designs.

I claim:

1. A tube support assembly, comprising:
an elongate member including a first end region, a second end region positioned opposite said elongate member from said first end region, and a central region positioned there between, said central region including a first exterior surface and a second exterior surface positioned opposite said elongate member said from first exterior surface, said first exterior surface including a first outwardly extending protrusion including a first aperture adapted to receive therein a first fuel tube and a second outwardly extending protrusion including a second aperture adapted to receive therein a second fuel tube, said central region further including a third aperture positioned between said first and second outwardly extending protrusions and being adapted to receive therein a fastener extending through said second exterior surface, said elongate member including a first fluid flow path communicating with said first aperture and said first end region and a second fluid flow path communicating with said second aperture and said second end region.

2. An assembly according to claim 1 wherein said third aperture is positioned within a third outwardly extending protrusion extending outwardly from said second exterior surface, said third aperture extending completely through said elongate member.

3. An assembly according to claim 1 wherein said first end region and said second end region are spaced from one another a distance equal to a length of said elongate member.

4. An assembly according to claim 1 further comprising a first fuel tube secured within said first aperture and a second fuel tube secured within said second aperture.

5. An assembly according to claim 1 further comprising a fastener secured within said third aperture.

6. A fuel tank assembly, comprising:
a fuel tank including a tank wall, said tank wall including a first tank wall aperture extending through said tank wall, and a second tank wall aperture extending through said tank wall;
an elongate member secured to said fuel tank wall at said second aperture, said elongate member including a first end region, a second end region positioned opposite said elongate member from said first end region, and a central region positioned there between, said central region including a first member aperture, a second member aperture and a third member aperture positioned between said first and second member apertures, said elongate member including a first fluid flow path communicating with said first member aperture and said first end region and a second fluid flow path communicating with said second member aperture and said second end region;
a first fuel tube positioned within said fuel tank, said first fuel tube including a first end secured to said tank wall at said first tank aperture and a second end secured to said elongate member at said first member aperture;
a second fuel tube positioned within said fuel tank, said second fuel tube including a first end secured to said tank wall at said first tank aperture and a second end secured to said elongate member at said second member aperture.

7. An assembly according to claim 6 further comprising a fastener extending through said second tank aperture and into said third member aperture, said fastener securing said elongate member to said tank wall.

8. An assembly according to claim 6 wherein said elongate member includes a first exterior surface and a second exterior surface positioned opposite said elongate member from said first exterior surface, wherein said first and second member apertures are positioned on said first exterior surface and said third member aperture is positioned on said second exterior surface.

9. An assembly according to claim 8 including on said first exterior surface a first outwardly extending protrusion including said first member aperture and a second outwardly extending protrusion including said second member aperture.

10. An assembly according to claim 9 including on said second exterior surface a third outwardly extending protrusion including said third member aperture.

11. An assembly according to claim 6 further comprising a flange secured to said tank at said first tank aperture, said first and second fuel tubes secured to said flange.

12. An assembly according to claim 7 further comprising a flange secured to said tank wall at said second tank aperture, said fastener secured to said flange and to said elongate member.

13. An assembly accordingly to claim 6 further including a tube support including a rigid elongate member having a first support end and a second support end separated from said first support end by a support member length, said first support end secured to said tank wall at said first tank aperture and said second support end including a first support aperture and a second support aperture, said first fuel tube extending along said support member length and through said first support aperture and said second fuel tube extending along said support member length and through said second support aperture.

14. An assembly according to claim 13 wherein said support member length is greater than one third of a length of said first fuel tube and said second fuel tube.

15. An assembly according to claim 6 wherein said second tank wall aperture comprises a drain aperture of said fuel tank.

* * * * *